(12) United States Patent
Funamoto et al.

(10) Patent No.: US 8,964,073 B2
(45) Date of Patent: Feb. 24, 2015

(54) IMAGE OUTPUTTING APPARATUS, IMAGE OUTPUTTING METHOD, IMAGE PROCESSING APPARATUS, IMAGE PROCESSING METHOD, PROGRAM, AND IMAGE PICKUP APPARATUS

(75) Inventors: Kazuhisa Funamoto, Kanagawa (JP); Tatsuo Shinbashi, Tokyo (JP); Hideyuki Matsumoto, Tokyo (JP); Hiroshi Shiroshita, Kanagawa (JP); Hiroki Kihara, Kanagawa (JP); Kenichi Maruko, Kanagawa (JP); Tatsuya Sugioka, Tokyo (JP); Naohiro Koshisaka, Hokkaido (JP); Shigetoshi Sasaki, Hokkaido (JP); Masato Tamori, Hokkaido (JP); Takayuki Toyama, Kanagawa (JP); Miho Ozawa, Kanagawa (JP); Hayato Wakabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 13/277,380

(22) Filed: Oct. 20, 2011

(65) Prior Publication Data

US 2012/0120287 A1 May 17, 2012

(30) Foreign Application Priority Data

Nov. 12, 2010 (JP) .................................. 2010-253833

(51) Int. Cl.
*H04N 3/14* (2006.01)
*H04N 5/335* (2011.01)
*H04N 5/232* (2006.01)

(52) U.S. Cl.
CPC ............... *H04N 5/335* (2013.01); *H04N 5/232* (2013.01)

USPC .......................... 348/294; 348/222.1; 714/701

(58) Field of Classification Search
USPC ................. 348/294, 222.1; 370/474; 714/701
See application file for complete search history.

(56) References Cited

U.S. PATENT DOCUMENTS

| 2004/0141088 A1 | 7/2004 | Schmidt |
| 2006/0024048 A1 | 2/2006 | Schmidt |
| 2010/0287449 A1 | 11/2010 | Kubo et al. |

FOREIGN PATENT DOCUMENTS

| JP | 2003-143191 A | 5/2003 |
| JP | 2008-200344 A | 9/2008 |
| JP | 2010-114762 | 5/2010 |
| WO | WO 2010/088625 A1 | 8/2010 |

OTHER PUBLICATIONS

Extended European Search Report Issued Mar. 21, 2013 in Patent Application No. 11185778.5.

(Continued)

*Primary Examiner* — Paul Berardesca
(74) *Attorney, Agent, or Firm* — Oblon, Spivak, McClelland, Maier & Neustadt, L.L.P.

(57) ABSTRACT

The present disclosure provides an image outputting apparatus, including, an image pickup section, an error correction code calculation section adapted to calculate an error correction code using pixel data, which configure an image obtained by image pickup by the image pickup section, as an information word, and an outputting section adapted to output coded data, which are data of a codeword obtained by adding the error correction code to the pixel data, to an image processing apparatus provided in an apparatus in which the image outputting apparatus is provided.

10 Claims, 13 Drawing Sheets

(56) References Cited

OTHER PUBLICATIONS

"Transmission System for Digital Terrestrial Television Broadcasting", ARIB STD-B31, Association of Radio Industries and Businesses, Version 1.9, Revised: Jul. 15, 2010, 199 pages.

Office Action issued on Jul. 8, 2014, in Japanese Patent Application No. 2010-253833.

Kyusam Lim, et al., A Multi-Lane MIPI CSI Receiver for Mobile Camera Applications, IEEE Transactions on Consumer Electronics, vol. 56, No. 3, Aug. 2010, pp. 1185-1190 and Cover Page.

U.S. Appl. No. 13/242,144, filed Sep. 23, 2011, Sugioka, et al.

| PARITY LENGTH INSTRUCTION SIGNAL | Reed Solomon INFORMATION LENGTH | CODEWARD LENGTH | CORRECTABLE BYTE NUMBER |
|---|---|---|---|
| 0 | 224 | 224 | 0 |
| 2 | 224 | 226 | 1 |
| 4 | 224 | 228 | 2 |

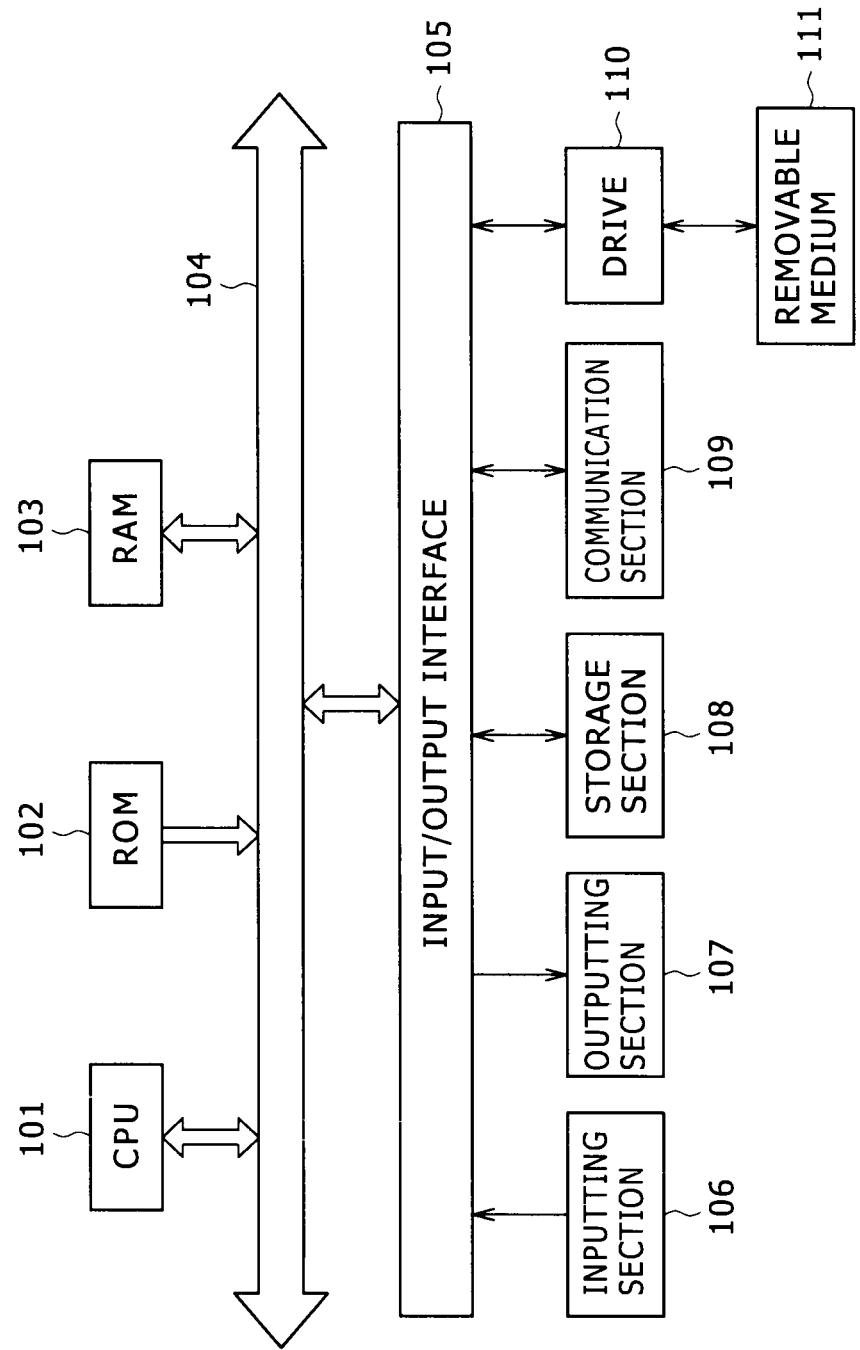

IMAGE OUTPUTTING APPARATUS, IMAGE OUTPUTTING METHOD, IMAGE PROCESSING APPARATUS, IMAGE PROCESSING METHOD, PROGRAM, AND IMAGE PICKUP APPARATUS

BACKGROUND

The technology disclosed herein relates to an image outputting apparatus, an image outputting method, an image processing apparatus, an image processing method, a program and an image pickup apparatus, and more particularly to a technique for transmitting image data.

Together with enhancement of the picture quality and increase of the frame rate of an image sensor, a transmission capacity for data demanded for an interface between an image sensor and an image processing LSI (Large Scale Integrated Circuit) for processing an image picked up by the image sensor is increasing.

In order to satisfy such a demand as described above, for example, such techniques as improvement of the clock frequency of an interface and reduction of the voltage for a signal are adopted. However, the techniques increase the difficulty in production of a sampling timing on the image processing LSI side and make it difficult to transmit data correctly.

Referred to the following documents for preceding technique. They are Japanese Patent Laid-Open No. 2010-114762, MIPI Alliance Standard for Camera Serial Interface 2 (CSI-2), and Digital Terrestrial Television Broadcasting Transmission System http://www.arib.or.jp/english/html/overview/doc/2-STD-B31v1_9.pdf are listed as related art documents.

SUMMARY

Incidentally, as a standard for increasing the transmission capacity between chips, PCI-Express, Serial ATA and so forth are available. In PCI-Express or Serial ATA, a high transmission capacity is implemented by enhancement in performance of a CDR (Clock Data Recovery) circuit or an equalizer. Further, for an interface between chips for a portable telephone set, the MIPI (Mobile Industry Processor Interface) standard is available.

Such standards as mentioned above prescribe involve many redundant functions to an interface between an image sensor and an image processing LSI from such a reason that they are prepared as interface standards for more general purposes like an interface between CPUs (Central Processing Units). If it is tried to adopt such standards as mentioned above for an interface between an image sensor and an image processing LSI, then also functions which are not required for the interface between an image sensor and an image processing LSI are incorporated. This increases the circuit area, power consumption and cost for incorporation.

Particularly, the influence of incorporation of a circuit for a countermeasure against a transmission error is high. In such standards as MIPI, a chip on the reception side issues a request to re-send data to a chip on the transmission side as a countermeasure against a transmission error. However, this gives rise to increase of the circuit area and so forth to an image sensor which is a device in which it is normally difficult to use an advanced/fine transistor because importance is attached to an image pickup characteristic.

Further, when a transmission error occurs, if this is covered by re-sending of the data, then the real-time property is damaged. This makes it difficult to transmit image data at a high frame rate.

Therefore, it is desirable to provide an image outputting apparatus, an image outputting method, an image processing apparatus, an image processing method, a program, a data structure, and an image pickup apparatus by which image data can be transmitted efficiently, for example, between an image sensor and an image processing LSI.

According to a first embodiment of the disclosed technology, there is provided an image outputting apparatus including an image pickup section, an error correction code calculation section adapted to calculate an error correction code using pixel data, which configure an image obtained by image pickup by the image pickup section, as an information word, and an outputting section adapted to output coded data, which are data of a codeword obtained by adding the error correction code to the pixel data, to an image processing apparatus provided in an apparatus in which the image outputting apparatus is provided.

The image outputting apparatus may further include a division section adapted to allocate a plurality of such coded data to a plurality of transmission lines between the image outputting apparatus and the image processing apparatus, wherein a number of such outputting sections equal to the number of the transmission lines being provided individually outputs the coded data allocated to the transmission lines by the division section.

In this instance, the division section may allocate the coded data which configure the same codeword to different ones of the transmission lines.

The image outputting apparatus may further include a control section adapted to set a coding rate for the codeword, where in the error correction code calculation section carries out the calculation of the error correction code in accordance with the coding rate set by the control section.

Further, according to the first embodiment of the disclosed technology, there is provided an image outputting method for an image outputting apparatus, including picking up an image, calculating an error correction code using pixel data, which configure the picked up image, as an information word, and outputting coded data, which are data of a codeword obtained by adding the error correction code to the pixel data, to an image processing apparatus provided in an apparatus in which the image outputting apparatus is provided.

Furthermore, according to the first embodiment of the disclosed technology, there is provided a program for causing a computer to execute a process including picking up an image, calculating an error correction code using pixel data, which configure the picked up image, as an information word, and outputting coded data, which are data of a codeword obtained by adding the error correction code to the pixel data, to an image processing apparatus provided in an apparatus in which the computer is provided.

In the first embodiment of the disclosed technology, an image is picked up, and an error correction code is calculated using pixel data, which configure the picked up image, as an information word. Then, coded data, which are data of a codeword obtained by adding the error correction code to the pixel data, are outputted to the image processing apparatus provided in the apparatus in which the computer is provided.

According to a second embodiment of the disclosed technology, there is provided an image processing apparatus including a reception section adapted to receive coded data which are data of a codeword produced by and outputted from an image pickup apparatus provided in an apparatus in which the image processing apparatus is provided, the codeword including pixel data which configure an image obtained by image pickup by an image pickup section of the image outputting apparatus and an error correction code calculated using the pixel data as an information word and added to the pixel data, an error correction section adapted to carry out error correction of the pixel data based on the error correction code included in the coded data, and an image processing section adapted to process the image configured from the pixel data after the error correction.

The image processing apparatus may be configured said that a plural number of such reception sections equal to the number of plural transmission lines between the image outputting apparatus and the image processing apparatus are provided, wherein the image processing apparatus further includes a coupling section adapted to acquire a plurality of coded data received by the plural reception sections and output the coded data in an order reverse to an allocation order of the coded data to the plural transmission lines by the image outputting apparatus, and the error correction section carries out the error correction using the coded data in an order in which the coded data are outputted from the coupling section.

The image processing apparatus may further include a control section adapted to set a coding rate of the codeword, wherein the error correction section carries out the error correction in accordance with the coding rate set by the control section.

Further, according to the second embodiment of the disclosed technology, there is provided an image processing method for an image processing apparatus, including receiving coded data which are data of a codeword produced by and outputted from an image pickup apparatus provided in an apparatus in which the image processing apparatus is provided, the codeword including pixel data which configure an image obtained by image pickup by an image pickup section of the image outputting apparatus and an error correction code calculated using the pixel data as an information word and added to the pixel data, carrying out error correction of the pixel data based on the error correction code included in the coded data, and processing the image configured from the pixel data after the error correction.

Furthermore, according to the second embodiment of the disclosed technology, there is provided a program for causing a computer to execute a process including receiving coded data which are data of a codeword produced by and outputted from an image pickup apparatus provided in an apparatus in which the computer is provided, the codeword including pixel data which configure an image obtained by image pickup by an image pickup section of the image outputting apparatus and an error correction code calculated using the pixel data as an information word and added to the pixel data, carrying out error correction of the pixel data based on the error correction code included in the coded data, and processing the image configured from the pixel data after the error correction.

In the second embodiment of the disclosed technology, coded data which are data of a codeword produced by and outputted from the image pickup apparatus provided in the apparatus in which the image processing apparatus or the computer is provided. The codeword includes pixel data which configure an image obtained by image pickup by an image pickup section of the image outputting apparatus and an error correction code calculated using the pixel data as an information word and added to the pixel data. Then, error correction of the pixel data is carried out based on the error correction code included in the coded data, and the image configured from the pixel data after the error correction is processed.

According to a third embodiment of the disclosed technology, there is provided an image pickup apparatus including an image outputting apparatus, and an image processing apparatus, wherein the image outputting apparatus includes an image pickup section, an error correction code calculation section adapted to calculate an error correction code using pixel data, which configure an image obtained by image pickup by the image pickup section, as an information word, and an outputting section adapted to output coded data, which are data of a codeword obtained by adding the error correction code to the pixel data, to the image processing apparatus, the image processing apparatus includes a reception section adapted to receive the coded data, an error correction section adapted to carry out error correction of the pixel data based on the error correction code included in the coded data, and an image processing section adapted to process the image configured from the pixel data after the error correction.

In the third embodiment of the disclosed technology, the image outputting apparatus picks up an image, and calculates an error correction code using pixel data, which configure an image obtained by image pickup by the image pickup section, as an information word. Then, the image outputting apparatus outputs coded data, which are data of a codeword obtained by adding the error correction code to the pixel data, to the image processing apparatus. Meanwhile, the image processing apparatus receives the coded data, and carries out error correction of the pixel data based on the error correction code included in the coded data. Then, the image processing apparatus processes the image configured from the pixel data after the error correction.

In summary, with the image outputting apparatus, image outputting method, image processing apparatus, image processing method, program and image pickup apparatus, image data can be transmitted efficiently.

BRIEF DESCRIPTION OF THE DRAWINGS

FIG. 15 is a block diagram showing an example of a configuration of a computer.

DETAILED DESCRIPTION OF THE PREFERRED EMBODIMENTS

First Embodiment

Configuration of the Image Sensor 1 and the Image Processing LSI 2

Figure 1:
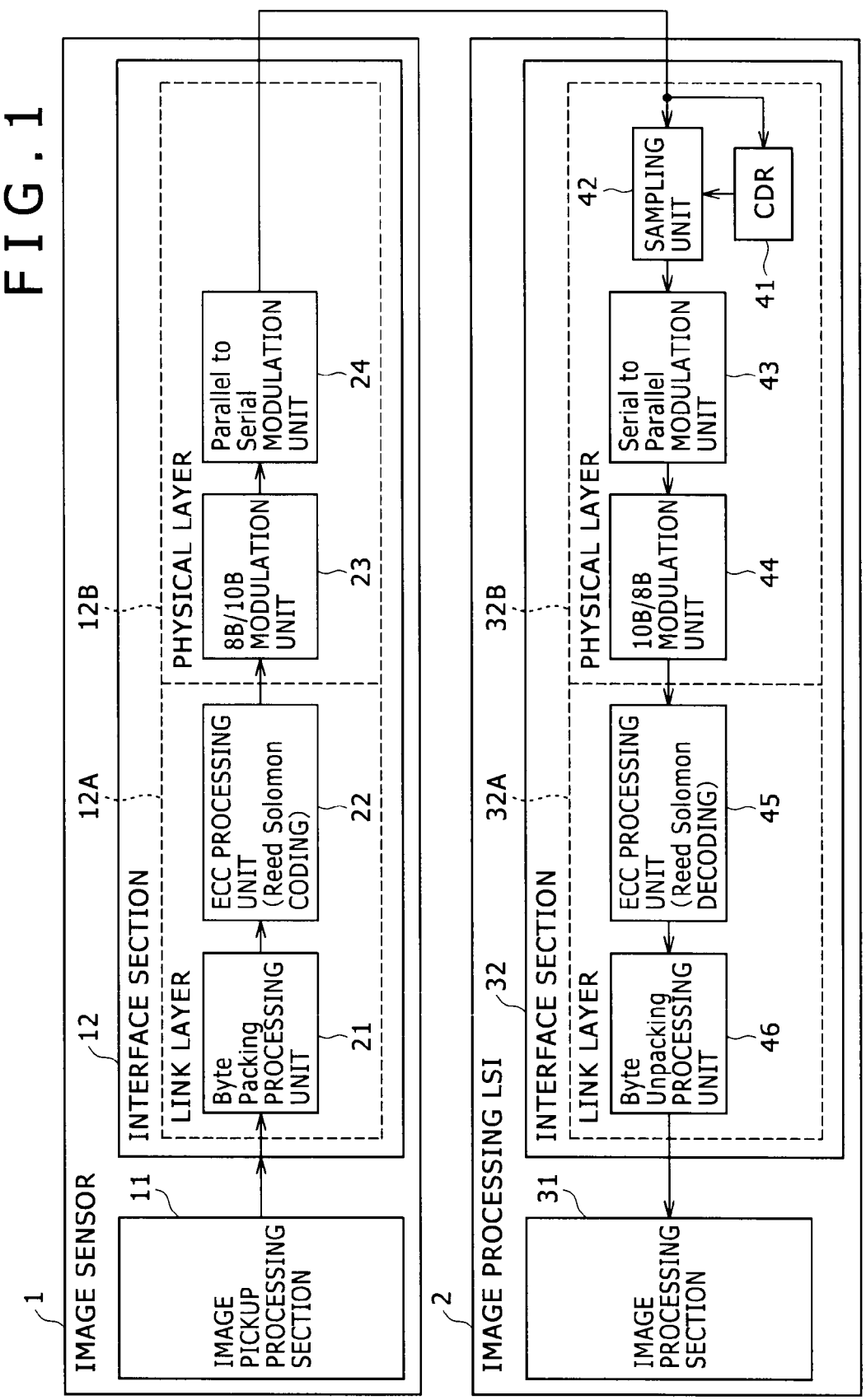
FIG. 1 is a block diagram showing a first example a configuration of a transmission system according to an embodiment of the disclosed technology.

FIG. 1 shows a first example of a configuration of a transmission system according to an embodiment of the disclosed technology.

Referring to FIG. 1, the transmission system shown is configured from an image sensor 1 and an image processing LSI (Large Scale Integrated Circuit) 2. The image sensor 1 and the image processing LSI 2 are formed from LSIs different from each other and are provided in the same image pickup apparatus having an image pickup function such as a digital camera or a portable telephone set.

In the example of FIG. 1, the image sensor 1 and the image processing LSI 2 are connected to each other by a single transmission line. The transmission line between the image sensor 1 and the image processing LSI 2 may be a wire transmission line or a wireless transmission line. In the following description, the transmission line between the image sensor 1 and the image processing LSI 2 is suitably referred to as a lane.

The image sensor 1 is configured from an image pickup processing section 11 and an interface section 12.

The image pickup processing section 11 is formed from an image pickup device such as a CMOS (Complementary Metal Oxide Semiconductor) image pickup device and carries out photoelectric conversion of light received through a lens not shown. The image pickup processing section 11 carries out A/D conversion and so forth for the signal obtained by the photoelectric conversion and outputs pixel data, which configure an image of one frame, one by one pixel data to the interface section 12.

The interface section 12 includes a configuration of a link layer 12A and a configuration of a physical layer 12B. The interface section 12 includes a Byte Packing processing unit 21 and an ECC (Error Correcting Code) processing unit 22 as the configuration of the link layer 12A. Further, the interface section 12 includes an 8B/10B conversion unit 23 and a Parallel to Serial conversion unit 24 as the configuration of the physical layer 12B.

The Byte Packing processing unit 21 acquires pixel data supplied thereto from the image pickup processing section 11 which is included in a configuration of an application layer and carries out a Byte Packing process for the acquired pixel data. The Byte Packing process converts data of each pixel into data of a unit of 1 byte.

Figure 2:
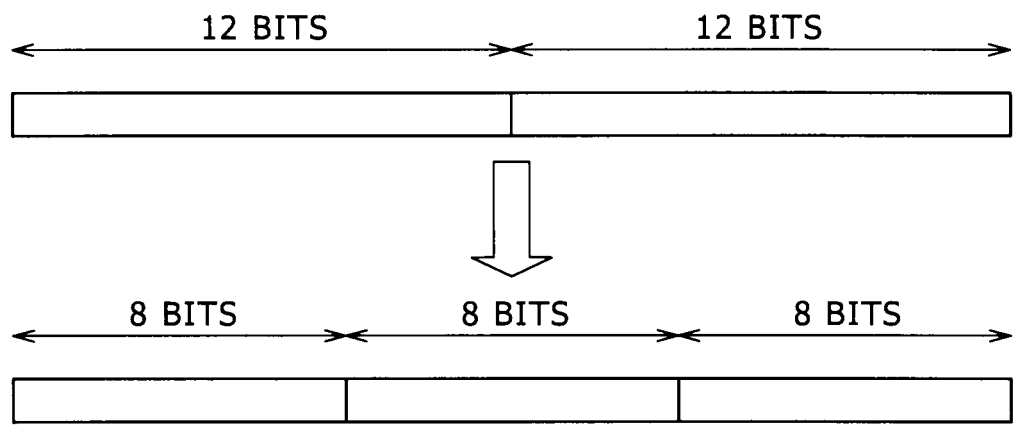
FIG. 2 is a diagrammatic view illustrating an example of a Byte Packing process.

FIG. 2 illustrates an example of the Byte Packing process.

Referring to FIG. 2, two data of a unit of 12 bits illustrated at the upper stage are pixel data of one pixel of an image picked up by the image pickup processing section 11. In the example of FIG. 2, the pixel value (RGB) of each pixel of the image picked up by the image pickup processing section 11 is represented by 12 bits.

The Byte Packing processing unit 21 carries out the Byte Packing process for data of a unit of 12 bits to produce three data of a unit of 8 bits as indicated ahead of a solid-white arrow mark.

The pixel value of each pixel of an image picked up by the image pickup processing section 11 is sometimes represented by a number of bits other than 12 bits. The Byte Packing processing unit 21 carries out a process of re-delimiting pixel data into data of a unit of 8 bits so that, by whichever bit number the pixel value of each pixel is represented, a processing section at a succeeding stage can carry out the same process. Referring back to FIG. 1, the Byte Packing processing unit 21 outputs pixel data of a unit of 1 byte, that is, of 8 bits, obtained by the Byte Packing process to the ECC processing unit 22.

The ECC processing unit 22 calculates an error correction code for use for error correction of pixel data based on the pixel data of a unit of 8 bits supplied thereto from the Byte Packing processing unit 21. Further, the ECC processing unit 22 adds a parity which is an error correction code determined by calculation to pixel data to carry out error correction coding. For example, the Reed Solomon code is used as the error correction code.

Figure 3:
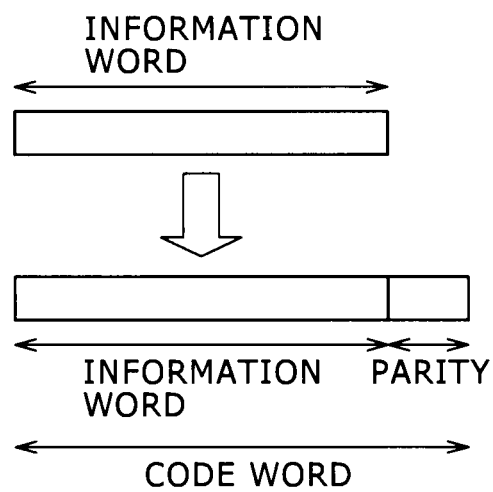
FIG. 3 is a diagrammatic view illustrating an example of error correction coding.

FIG. 3 illustrates an example of the error correction coding by the ECC processing unit 22.

Referring to FIGS. 1 and 3, the ECC processing unit 22 applies a generating polynomial to a predetermined number of pixel data of a unit of 8 bits as an information word to carry out calculation of a parity. For example, also the parity determined by the ECC processing unit 22 is data of a unit of 8 bits. The ECC processing unit 22 adds the parity determined by the calculation to the information word as indicated ahead of a solid-white arrow mark to produce a codeword. The ECC processing unit 22 outputs the coded data which is data of the produced codeword to the 8B/10B conversion unit 23.

Referring back to FIG. 1, the 8B/10B conversion unit 23 carries out 8B/10B conversion for the coded data supplied thereto from the ECC processing unit 22 and outputs the coded data after conversion into data of a unit of 10 bits to the Parallel to Serial conversion unit 24.

The Parallel to Serial conversion unit 24 carries out Parallel to Serial conversion for the coded data supplied thereto from the 8B/10B conversion unit 23 and transmits resulting serial coded data to the image processing LSI 2 through the transmission line.

Referring back to FIG. 1, the image processing LSI 2 is configured from an image processing section 31 and an interface section 32.

Also the interface section 32 includes a configuration of a link layer 32A and a configuration of a physical layer 32B similarly to the interface section 12 of the image sensor 1. The interface section 32 includes a CDR (Clock Data Recovery) section 41, a sampling unit 42, a Serial to Parallel conversion unit 43 and a 10B/8B conversion unit 44 as the configuration of the physical layer 32B thereof. The interface section 32 further includes an ECC processing unit 45 and a Byte Unpacking processing unit 46 as the configuration of the link layer 32A. A signal representative of coded data outputted from the Parallel to Serial conversion unit 24 of the image sensor 1 is inputted to the CDR section 41 and the sampling unit 42.

The CDR section 41 detects an edge of the input signal to establish bit synchronism and produces a clock signal based on the detection period of the edge. The CDR section 41 outputs the produced clock signal to the sampling unit 42.

The sampling unit 42 carries out sampling of the input signal in accordance with the clock signal produced by the CDR section 41 and outputs coded data obtained by the sampling to the Serial to Parallel conversion unit 43.

The Serial to Parallel conversion unit 43 carries out Serial to Parallel conversion for the coded data supplied thereto from the sampling unit 42 and outputs resulting coded data of a unit of 10 bits to the 10B/8B conversion unit 44.

The 10B/8B conversion unit 44 carries out 10B/8B conversion for the coded data of a unit of 10 bits supplied thereto from the Serial to Parallel conversion unit 43 and outputs resulting coded data of a unit of 8 bits to the ECC processing unit 45.

The ECC processing unit 45 carries out error correction arithmetic operation based on a parity included in the coded data supplied thereto from the 10B/8B conversion unit 44 to detect an error of pixel data and carries out correction of the detected error. The ECC processing unit 45 carries out error correction decoding for each codeword and outputs pixel data after the error correction to the Byte Unpacking processing unit 46.

The Byte Unpacking processing unit 46 carries out a Byte Unpacking process for the pixel data of a unit of 8 bits supplied thereto from the ECC processing unit 45. The Byte Unpacking process is a process of converting pixel data of a unit of 8 bits into pixel data whose pixel value is represented by a number of bits equal to the number of bits by which the pixel value of each pixel of an image picked up by the image pickup processing section 11 is represented.

In particular, the Byte Unpacking processing unit 46 carries out a process reverse to the process described hereinabove with reference to FIG. 2 to convert pixel data of a unit of 8 bits into pixel data whose pixel value is represented by a predetermined number of bits such as 10 bits or 12 bits. The Byte Unpacking processing unit 46 outputs the pixel data obtained by the Byte Unpacking process to the image processing section 31 which is included in the configuration of the application layer.

The image processing section 31 produces an image of one frame based on pixel data supplied thereto from the Byte Unpacking processing unit 46 and carries out various image processes using the produced image. Pixel data outputted from the image sensor 1 are data of a RAW image, and the image processing section 31 carries out various processes such as compression of the image data, display of an image and recording of the image data on or into a recording medium.

Operation of the Image Sensor 1 and the Image Processing LSI 2

Here, a series of processes of the image sensor 1 and the image processing LSI 2 having the configuration described above are described.

Figure 4:
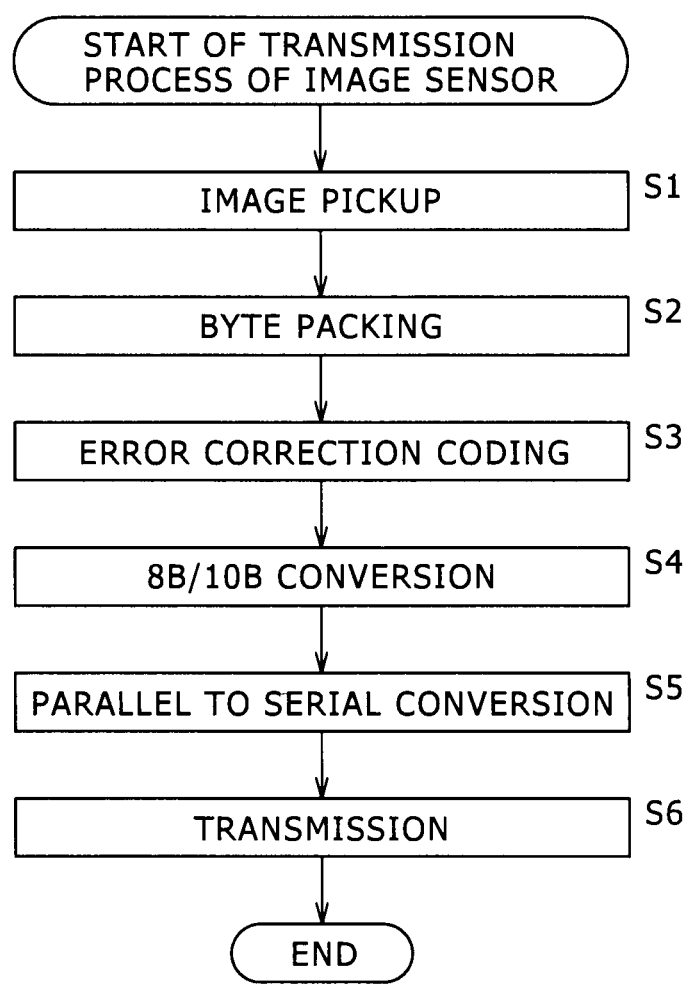
FIG. 4 is a flow chart illustrating a transmission process of an image sensor shown in FIG. 1.

First, a transmission process of the image sensor 1 is described with reference to a flow chart of FIG. 4. The process of FIG. 4 is started when image pickup is started in response to an instruction to start image pickup which is issued, for example, when a shutter button provided on the image pickup apparatus which includes the image sensor 1 and the image processing LSI 2 is pressed.

First at step S1, the image pickup processing section 11 carries out image pickup. The image pickup processing section 11 successively outputs pixel data which configure an image of one frame obtained by the image pickup one by one pixel data.

At step S2, the Byte Packing processing unit 21 acquires the pixel data supplied thereto from the image pickup processing section 11 and carries out a Byte Packing process.

At step S3, the ECC processing unit 22 calculates a parity based on the pixel data of a unit of 8 bits obtained by the Byte Packing process and adds the parity to the pixel data to carry out error correction coding.

At step S4, the 8B/10B conversion unit 23 carries out 8B/10B conversion for the coded data obtained by the error correction coding.

At step S5, the Parallel to Serial conversion unit 24 carries out Parallel to Serial conversion for the coded data after the 8B/10B conversion.

At step S6, the Parallel to Serial conversion unit 24 transmits serial coded data obtained by the Parallel to Serial conversion to the image processing LSI 2 through the transmission line. The processes at steps S2 to S6 are carried out repetitively for all pixels which configure the image of one frame and are ended when the transmission of the data of all pixels which configure the image of one frame is completed.

Figure 5:
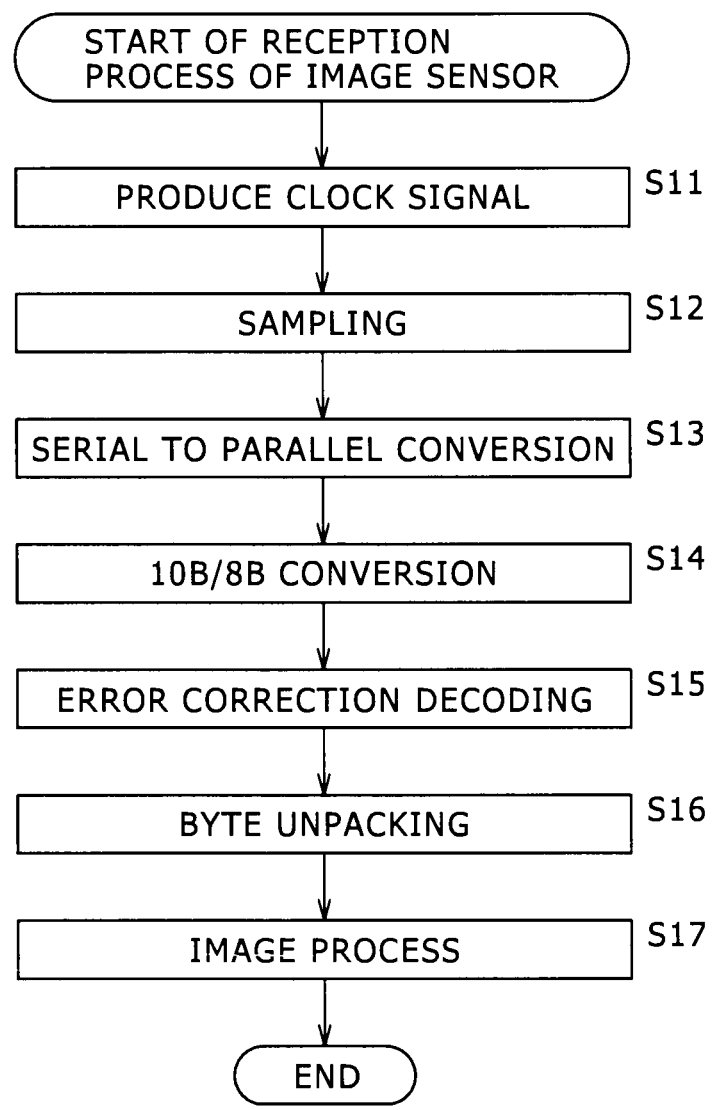
FIG. 5 is a flow chart illustrating a reception process of an image processing LSI shown in FIG. 1.

Now, a reception process of the image processing LSI 2 is described with reference to a flow chart of FIG. 5.

First at step S11, the CDR section 41 receives a signal transmitted thereto from the image sensor 1 and produces a clock signal.

At step S12, the sampling unit 42 carries out sampling in accordance with the clock signal produced by the CDR section 41.

At step S13, the Serial to Parallel conversion unit 43 carries out Parallel to Serial conversion for coded data obtained by the sampling.

At step S14, the 10B/8B conversion unit 44 carries out 10B/8B conversion for coded data of a unit of 10 bits obtained by the Serial to Parallel conversion.

At step S15, the ECC processing unit 45 carries out error correction decoding based on the coded data of a unit of 8 bits to correct an error of the pixel data.

At step S16, the Byte Unpacking processing unit 46 carries out a Byte Unpacking process for the pixel data of a unit of 8 bits after the error correction. The processes at steps S11 to S16 are carried out repetitively for coded data produced by the image sensor 1 based on all pixel data which configure an image of one frame.

When the process of coded data produced based on all pixel data which configure an image of one frame ends, the image processing section 31 produces an image of one frame based on the pixel data supplied from the Byte Unpacking processing unit 46 at step S17. The image processing section 31 carries out image processing using the produced image and ends its processing when the image processing is completed.

As described above, in the transmission system which includes the image sensor 1 and the image processing LSI 2, a circuit for carrying out an ECC process is provided in the link layer of the interface section and corrects a transmission error appearing in the physical layer in the link layer. Consequently, when an error appears with pixel data, there is no necessity to issue a request to re-send the pixel data to the image sensor 1. Therefore, while an error countermeasure is assured, the real time property of data transmission can be implemented. Further, since there is no necessity to provide a transmission line for the re-sending request, simplification in circuit configuration and reduction in cost can be anticipated.

Figure 6:
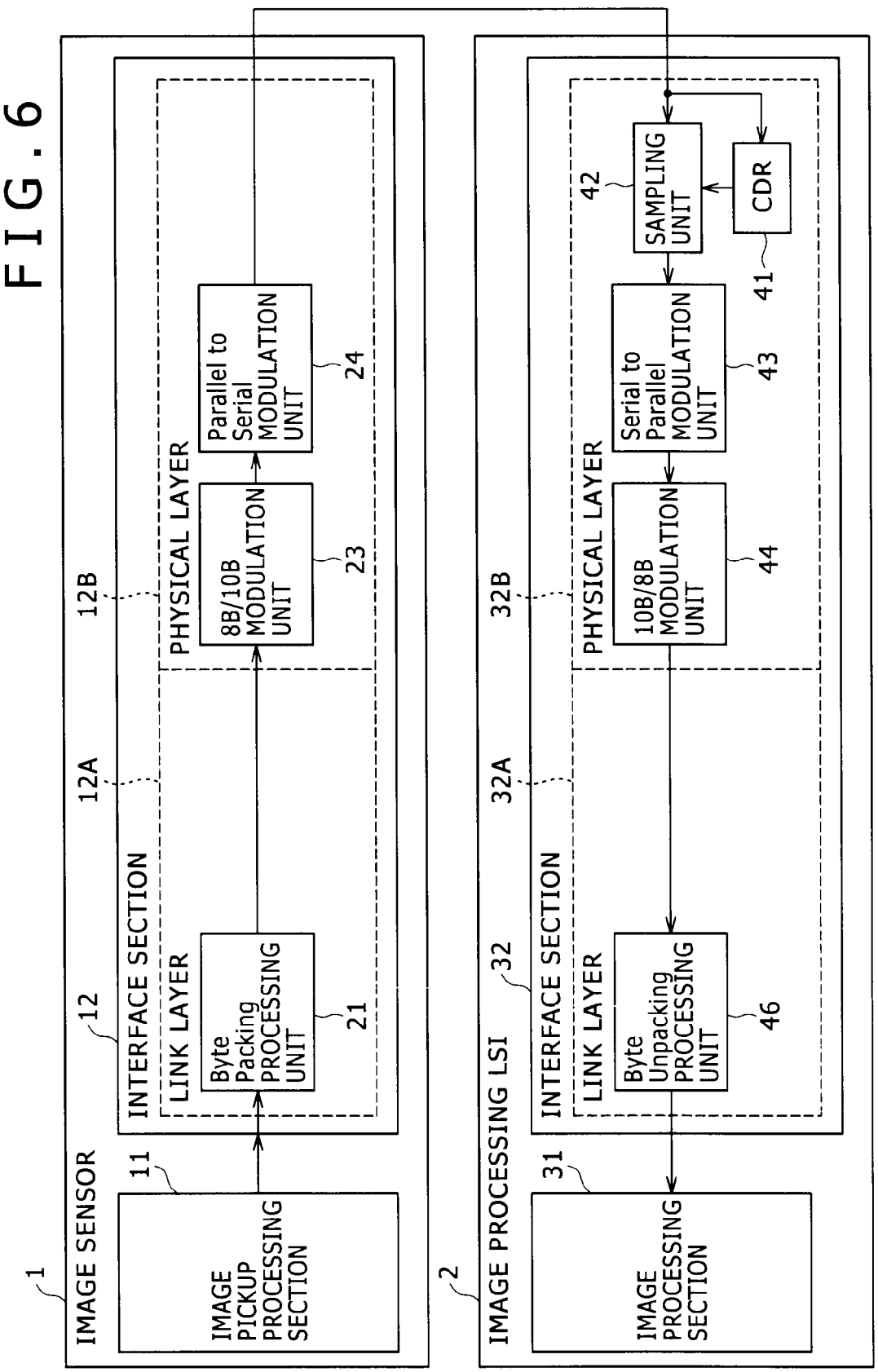
FIG. 6 is a block diagram showing a configuration of an image sensor and an image processing LSI which do not include an ECC processing unit.

FIG. 6 shows a configuration of the image sensor 1 and the image processing LSI 2 which do not include the ECC processing unit. In this instance, if a transmission error appears, then a re-sending request for data is issued from the image processing LSI 2 to the image sensor 1. Therefore, the real time property cannot be assured, and also the circuit configuration is complicated.

Second Embodiment

Configuration of the Image Sensor 1 and the Image Processing LSI 2

Figure 7:
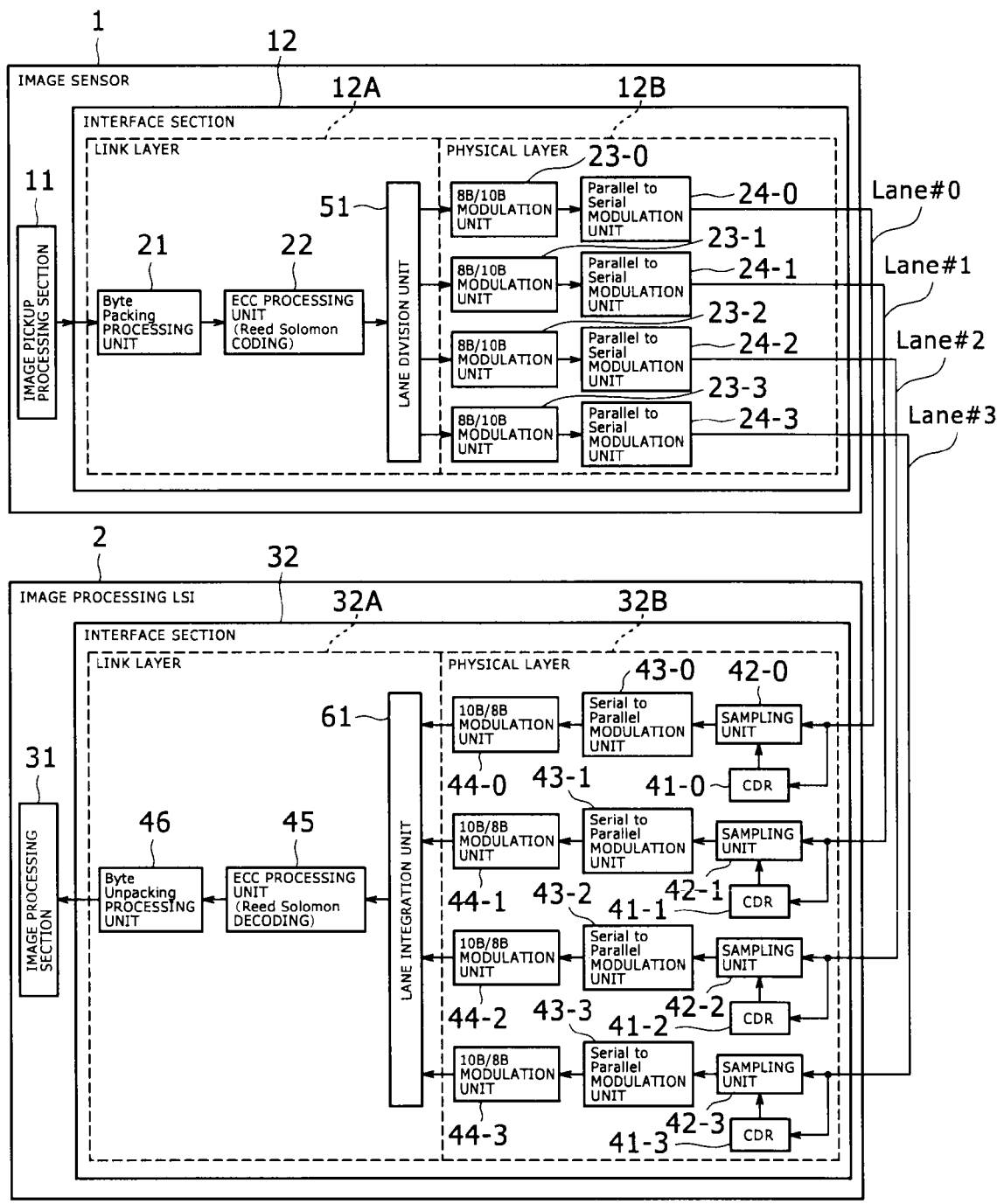
FIG. 7 is a block diagram showing a second example of a configuration of the transmission system.

FIG. 7 shows a second example of a configuration of a transmission system.

Referring to FIG. 7, the transmission system shown includes several common components to those of the transmission system described hereinabove with reference to FIG. 1. Description of such common components is omitted herein to avoid redundancy.

In the transmission system shown in FIG. 7, an image sensor 1 and an image processing LSI 2 are connected to each other through four lanes Lane#0 to Lane#3. A lane nearer to the application layer is regarded as a higher order lane while a lane nearer to the physical layer is regarded as a lower order lane. A lane division section 51 is provided at a lower order position of the link layer 12A of the interface section 12 than the ECC processing unit 22. The physical layer 12B includes four 8B/10B conversion units and four Parallel to Serial conversion units in a corresponding relationship to the lanes Lane#0 to Lane#3.

Meanwhile, the physical layer 32B of the image processing LSI 2 includes four CDRs, four sampling units, four Serial to Parallel conversion units and four 10B/8B conversion units in a corresponding relationship to the lanes Lane#0 to Lane#3. Meanwhile, the link layer 32A includes a lane coupling section 61 provided at a lower order position than the ECC processing unit 45.

The ECC processing unit 22 of the interface section 12 applies a generating polynomial to a predetermined number of pixel data of a unit of 8 bits as an information word to carry out calculation of a parity. The ECC processing unit 22 adds the parity determined by the calculation to the pixel data as an information word to produce coded data and outputs the coded data to the lane division section 51.

The lane division section 51 allocates the coded data formed from the pixel data of a unit of 8 bits and the parity supplied thereto from the ECC processing unit 22 to the lanes Lane#0 to Lane#3 in order beginning with the top data to carry out lane division. The lane division section 51 carries out the lane division such that, when certain coded data is allocated to the lane Lane#3, the lane division section 51 allocates the succeeding coded data in order to the lanes beginning with the lane Lane#0.

Figure 8:
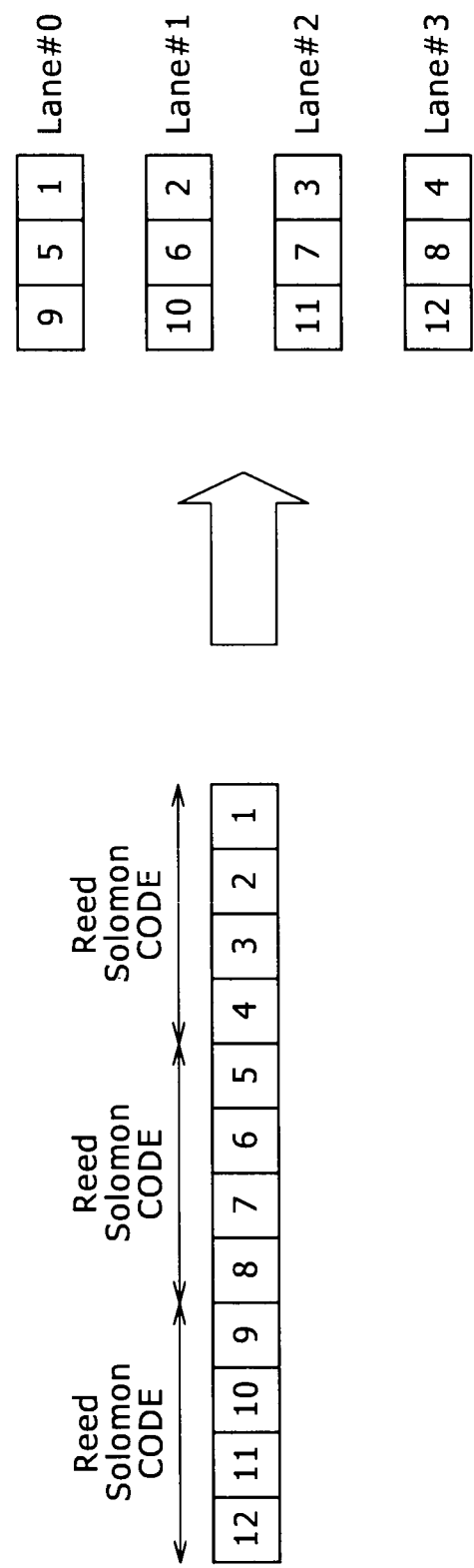
FIG. 8 is a diagrammatic view illustrating an example of lane division.

FIG. 8 illustrates an example of the lane division.

Referring to FIG. 8, each block with a numeral added thereto represents pixel data or a unit of 8 bits or a parity. One codeword is configured from data of 32 bits of the blocks 1 to 4, blocks 5 to 8 and blocks 9 to 12, and the coded data of the blocks 1 to 12 are supplied in order.

In this instance, the lane division section 51 allocates coded data supplied thereto from the ECC processing unit 22 to the lanes Lane#0 to Lane#3 such that coded data which configure the same codeword may not be transmitted using the same line. In the example of FIG. 8, the coded data of the blocks 1 to 4 which configure the same codeword are successively allocates to the lanes Lane#0 to Lane#3, and similarly, the coded data of the blocks 5 to 8 which configure the same codeword are successively allocated to the lanes Lane#0 to Lane#3. Further, the coded data of the blocks 9 to 12 which configure the same codeword are successively allocated to the lanes Lane#0 to Lane#3.

The coded data of the blocks 1, 5 and 9 allocated to the lane Lane#0 are supplied in this order to the 8B/10B conversion unit 23-0, and the coded data of the blocks 2, 6 and 10 allocated to the lane Lane#1 are supplied in this order to the 8B/10B conversion unit 23-1. Further, the coded data of the blocks 3, 7 and 11 allocated to the lane Lane#2 are supplied in this order to the 8B/10B conversion unit 23-2, and the coded data of the blocks 4, 8 and 12 allocated to the lane Lane#3 are supplied in this order to the 8B/10B conversion unit 23-3.

The 8B/10B conversion unit 23-0 carries out 8B/10B conversion for the coded data supplied thereto from the lane division section 51 and outputs resulting coded data of a unit of 10 bits to the Parallel to Serial conversion unit 24-0.

The Parallel to Serial conversion unit 24-0 carries out Parallel to Serial conversion for the coded data supplied thereto from the 8B/10B conversion unit 23-0 and transmits resulting serial coded data to the image processing LSI 2 through the lane Lane#0.

Also the 8B/10B conversion units 23-1 to 23-3 individually carry out 8B/10B conversion for the coded data supplied thereto from the lane division section 51. The 8B/10B conversion units 23-1 to 23-3 output resulting coded data of a unit of 10 bits to the Parallel to Serial conversion units 24-1 to 24-3, respectively.

The Parallel to Serial conversion units 24-1 to 24-3 carry out Parallel to Serial conversion for the coded data supplied thereto from the 8B/10B conversion units 23-1 to 23-3, respectively. The Parallel to Serial conversion units 24-1 to 24-3 transmit resulting serial coded data to the image processing LSI 2 through the lanes Lane#1 to Lane#3, respectively.

A signal representative of the coded data outputted from the Parallel to Serial conversion unit 24-0 is inputted to the CDR section 41-0 and the sampling unit 42-0. A signal representative of the coded data outputted from the Parallel to Serial conversion unit 24-1 is inputted to the CDR section 41-1 and the sampling unit 42-1. A signal representative of the coded data outputted from the Parallel to Serial conversion unit 24-2 is inputted to the CDR section 41-2 and the sampling unit 42-2. A signal representative of the coded data outputted from the Parallel to Serial conversion unit 24-3 is inputted to the CDR section 41-3 and the sampling unit 42-3.

The CDR section 41-0 detects an edge of the input signal to establish bit synchronism and produces a clock signal. The CDR section 41-0 outputs the produced clock signal to the sampling unit 42-0.

The sampling unit 42-0 carries out sampling of the input signal in accordance with the clock signal produced by the CDR section 41-0 and outputs coded data obtained by the sampling to the Serial to Parallel conversion unit 43-0.

The Serial to Parallel conversion unit 43-0 carries out Serial to Parallel conversion for the coded data supplied thereto from the sampling unit 42-0 and outputs resulting coded data of a unit of 10 bits to the 10B/8B conversion unit 44-0.

The 10B/8B conversion unit 44-0 carries out 10B/8B conversion for the coded data of a unit of 10 bits supplied thereto from the Serial to Parallel conversion unit 43-0 and outputs resulting coded data of a unit of 8 bits to the lane coupling section 61.

Also the CDR sections 41-1 to 41-3 similarly detect an edge of a signal inputted thereto to produce a clock signal and output the clock signals to the sampling units 42-1 to 42-3, respectively.

The sampling units 42-1 to 42-3 carries out sampling of the input signal in accordance with the clock signals produced by the CDR sections 41-1 to 41-3, respectively. The sampling units 42-1 to 42-3 outputs coded data obtained by the sampling to the Serial to Parallel conversion units 43-1 to 43-3, respectively.

The Serial to Parallel conversion units 43-1 to 43-3 carry out Serial to Parallel conversion for the coded data supplied thereto from the sampling units 42-1 to 42-3, respectively. The sampling units 42-1 to 42-3 output resulting coded data of a unit of 10 bits to the 10B/8B conversion units 44-1 to 44-3, respectively.

The 10B/8B conversion units 44-1 to 44-3 carry out 10B/8B conversion for the coded data of a unit of 10 bits supplied thereto from the Serial to Parallel conversion units 43-1 to 43-3, respectively. The 10B/8B conversion units 44-1 to 44-3 output resulting coded data of a unit of 8 bits to the lane coupling section 61.

The lane coupling section 61 re-arranges the coded data supplied thereto from the 10B/8B conversion units 44-0 to 44-3 in an order reverse to the allocation order to the lanes by the lane division section 51 of the image sensor 1 to carry out lane coupling or integration.

Figure 9:
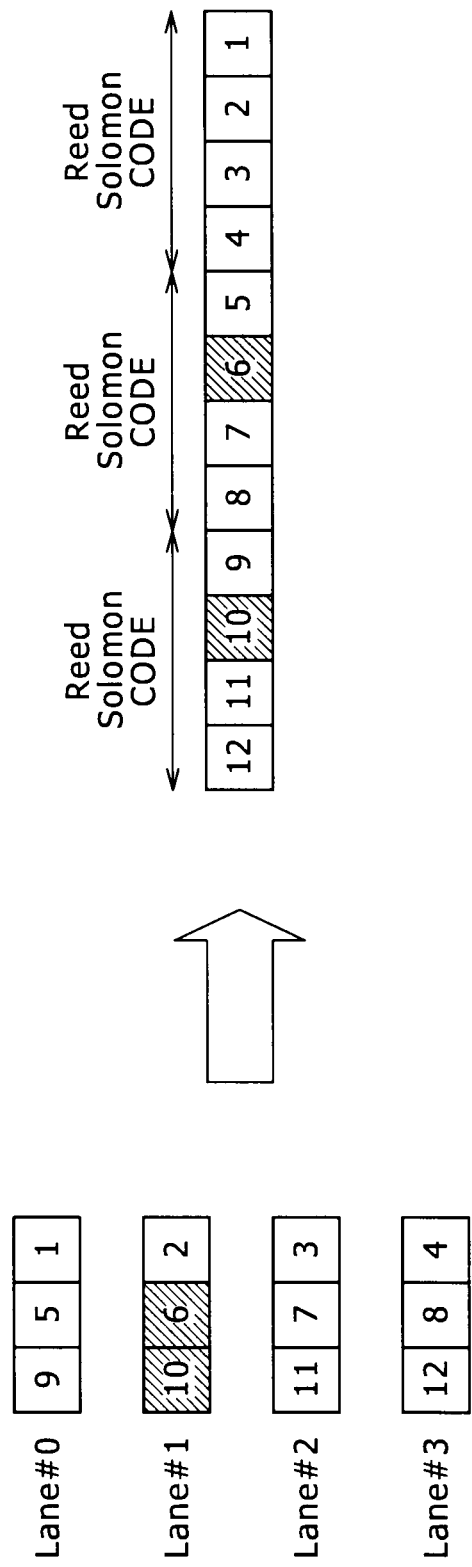
FIG. 9 is a diagrammatic view illustrating an example of lane coupling.

FIG. 9 illustrates an example of the lane coupling.

It is assumed that the lane division of the coded data of the blocks 1 to 12 is carried out in such a manner as described hereinabove with reference to FIG. 8. In this instance, the lane coupling section 61 re-arranges the coded data in the reverse order to the allocation order to the lanes upon lane division to produce such coded data of the same sequence as that in the outputting order from the ECC processing unit 22 as indicated ahead of a solid-white arrow mark in FIG. 9. The lane coupling section 61 outputs the coded data of the blocks 1 to 12 produced by the re-arrangement described above in order to the ECC processing unit 45.

The ECC processing unit 45 carries out error correction arithmetic operation based on the parity included in the coded data supplied thereto from the lane coupling section 61 to detect an error of the pixel data and carries out correction of the detected error. The ECC processing unit 45 carries out error correction for each codeword and outputs pixel data after the error correction to the Byte Unpacking processing unit 46.

Operation of the Image Sensor 1 and the Image Processing LSI 2

Here, a series of processes of the image sensor 1 and the image processing LSI 2 having the configuration described above are described.

Figure 10:
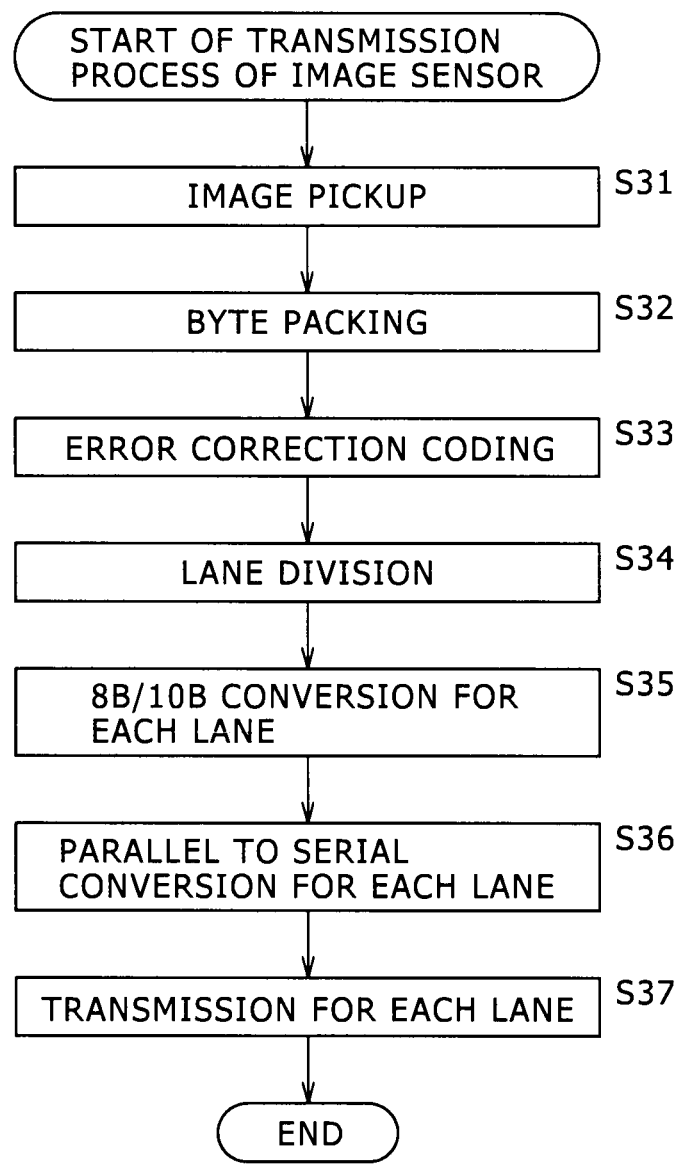
FIG. 10 is a flow chart illustrating a transmission process of an image sensor shown in FIG. 7.

First, a transmission process of the image sensor 1 is described with reference to a flow chart of FIG. 10. The process of FIG. 10 is basically similar to that described hereinabove with reference to FIG. 4 except that a process for lane division is added.

At step S31, the image pickup processing section 11 carries out image pickup and successively outputs pixel data which configure an image of one frame one by one pixel data.

At step S32, the Byte Packing processing unit 21 acquires the pixel data supplied thereto from the image pickup processing section 11 and carries out a Byte Packing process.

At step S33, the ECC processing unit 22 calculates a parity based on the pixel data of a unit of 8 bits obtained by the Byte Packing process and adds the parity to the pixel data to carry out error correction coding.

At step S34, the lane division section 51 carries out lane division of the coded data obtained by the error correction coding.

The process after the lane division is carried out in parallel for the coded data allocated to the different lanes. At step S35, the 8B/10B conversion units 23-0 to 23-3 carry out 8B/10B conversion for the coded data allocated by the lane division section 51.

At step S36, the Parallel to Serial conversion units 24-0 to 24-3 individually convert the coded data after the 8B/10B conversion into serial data.

At step S37, the Parallel to Serial conversion units 24-0 to 24-3 transmit the serial coded data obtained by the Parallel to Serial conversion to the image processing LSI 2 through the lanes Lane#0 to Lane#3, respectively. The processes at steps S32 to S37 are carried out repetitively for all pixels which configure the image of one frame and end when the transmission of the data of all pixels which configure the image of one frame ends.

Figure 11:
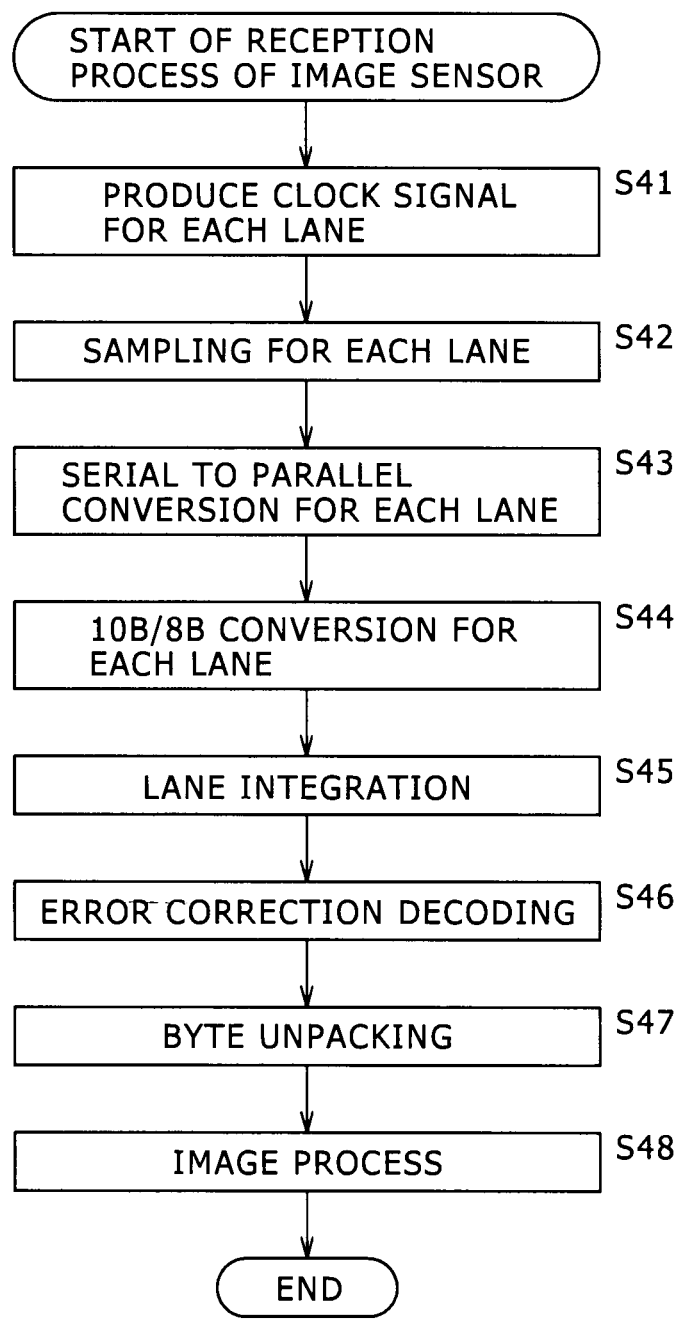
FIG. 11 is a flow chart illustrating a reception process of an image processing LSI shown in FIG. 7.

Now, a reception process of the image processing LSI 2 is described with reference to a flow chart of FIG. 11. The process of FIG. 11 is basically similar to that descried hereinabove with reference to FIG. 5.

At step S41, the CDR sections 41-0 to 41-3 receive signals representative of coded data transmitted thereto from the image sensor 1 through the lanes Lane#0 to Lane#3, respectively, and individually produce a clock signal.

At step S42, the sampling units 42-0 to 42-3 carry out sampling in accordance with the respective clock signals.

At step S43, the Serial to Parallel conversion units 43-0 to 43-3 carry out Serial to Parallel conversion individually for the coded data obtained by the sampling.

At step S44, the 10B/8B conversion units 44-0 to 44-3 carry out 10B/8B conversion for the coded data in a unit of 10 bits obtained by the Serial to Parallel conversion.

At step S45, the lane coupling section 61 re-arranges the coded data supplied thereto from the 10B/8B conversion units 44-0 to 44-3 in the order reverse to the allocation order to the lanes upon lane division to carry out lane coupling.

At step S46, the ECC processing unit 45 carries out error correction decoding for the coded data of a unit of 8 bits after the lane coupling to correct an error of the pixel data.

At step S47, the Byte Unpacking processing unit 46 carries out a Byte Unpacking process for the pixel data of a unit of 8 bits after the error correction. The processes at steps S41 to 47 are carried out repetitively for the coded data produced by the image sensor 1 based on all pixel data which configure the image of one frame.

When the process of the coded data produced based on all pixel data which configure the image of one frame ends, the image processing section 31 produces an image of one frame based on the pixel data supplied from the Byte Unpacking processing unit 46 at step S48. The image processing section 31 carries out an image process using the produced image and ends the processing when the image process ends.

In this manner, if division of coded data is carried out by the link layer 12A and a process after the division is carried out in parallel by the physical layer 12B and then the coded data are transmitted in parallel using a plurality of lanes, then high-speed data transmission can be achieved. While the foregoing description relates to a case in which the number of lanes is four, also it is possible to use a greater number of lanes.

Further, by carrying out lane division/coupling at a position lower than the ECC processing unit, it is necessary for only one ECC processing unit to be provided in each of the image sensor 1 and the image processing LSI 2, resulting in reduction of the circuit scale.

For example, if lane division is carried otherwise at a position higher than the ECC processing unit which carries out error correction coding, then it is necessary to prepare a number of ECC processing units equal to the number of lanes, resulting in increase of the circuit scale of the image sensor 1. However, such a situation as just described can be prevented. Further, if lane coupling is carried out otherwise at a position higher than the ECC processing unit which carries out error detection decoding, then it is necessary to prepare a number of ECC processing units equal to the number of lanes, resulting in increase of the circuit scale of the image processing LSI 2. However, such a situation as just described can be prevented.

Figure 12:
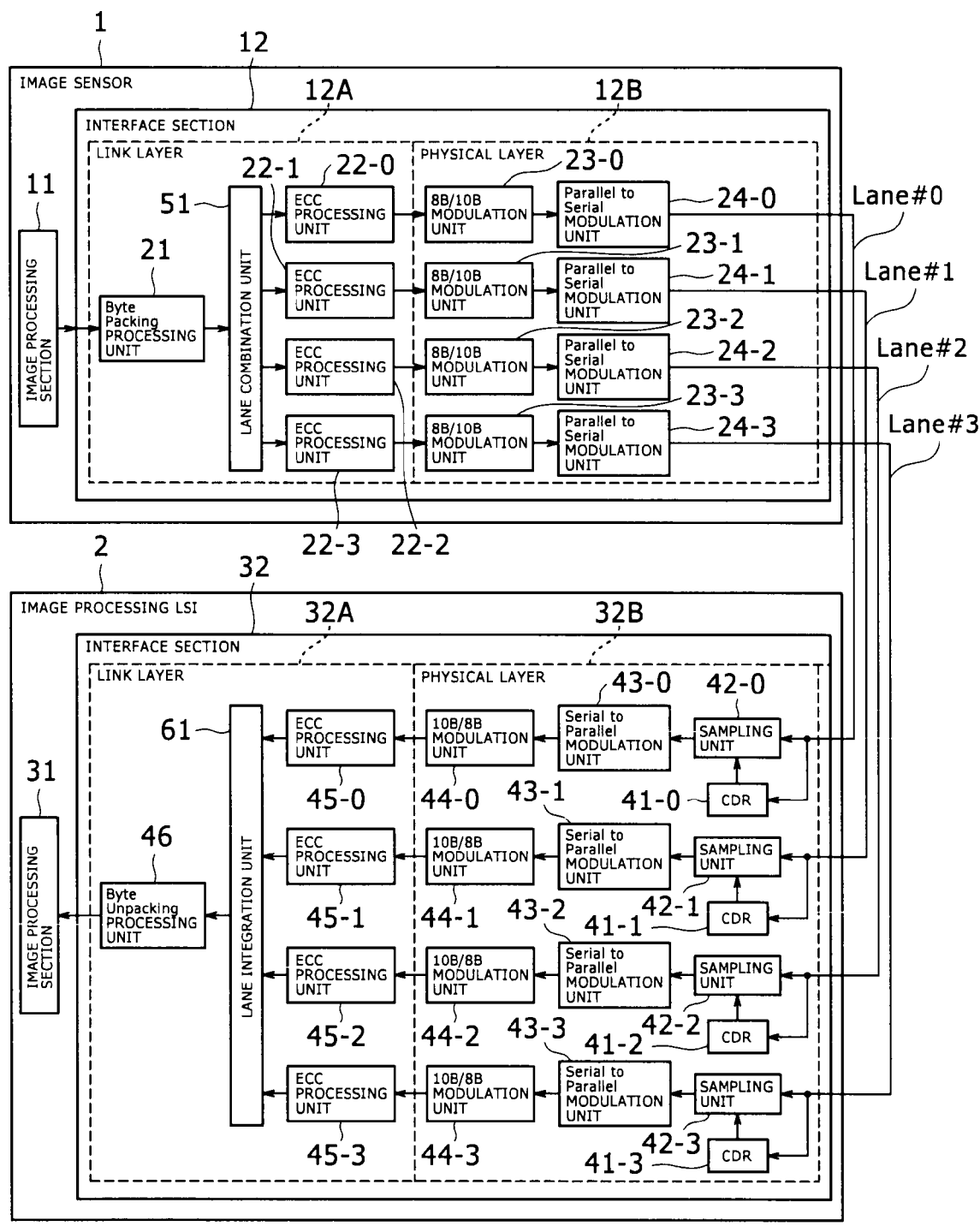
FIG. 12 is a block diagram showing another configuration of the image sensor and the image processing LSI.

A configuration of the image sensor 1 which carries out error correction coding after lane division and a configuration of the image processing LSI 2 which carries out error correction decoding before lane coupling are shown in FIG. 12. In the link layer 12A of the image sensor 1 of FIG. 12, a number of ECC processing units 22-0 to 22-3 equal to the number of lanes are provided at a position lower than the lane division section 51. Further, in the link layer 32A of the image processing LSI 2, a number of ECC processing units 45-0 to 45-3 equal to the number of lanes are provided at a position lower than the lane coupling section 61.

Further, by carrying out error correction coding before lane division and transmitting coded data which configure the same codeword through different lanes, burst errors, that is, successive errors, appearing in a transmission line can be dispersed into the codeword after the decoding. Consequently, the error correction capacity can be improved.

For example, a case is studied in which burst errors of 2 bytes appear in the lane Lane#1 as indicated on the left side in FIG. 9. The coded data of the block 6 and the coded data of the block 10 successively transmitted along the lane Lane#1 have errors. Among the blocks shown in FIG. 9, each block indicated by slanting lines represents a block of coded data which suffers from an error, and each block indicated by no slanting line represents a block of coded data which does not suffer from an error.

In this instance, in the coded data after the lane coupling, the coded data of the block 6 and the coded data of the block 10 transmitted through the lane Lane#1 are dispersed into different codewords. Generally, most of error correction codes are vulnerable to burst errors. For example, in the case of the Reed Solomon code, since the number of errors which can be corrected per one codeword is determined, if it is possible to disperse burst errors, which are concentrated upon one codeword, between different codewords, then the error correction capacity can be enhanced.

Third Embodiment

Figure 13:
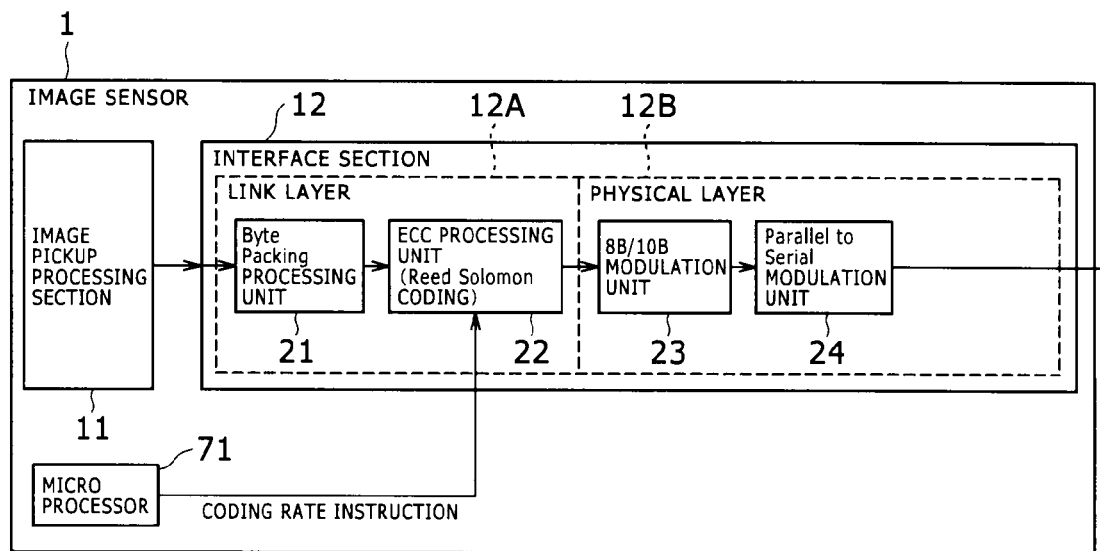
FIG. 13 is a block diagram showing a third example of a configuration of the transmission system.

FIG. 13 shows a third example of a configuration of a transmission system.

Referring to FIG. 13, the transmission system shown includes several common components to those of the transmission system described hereinabove with reference to FIG. 1. Overlapping description of such common components is omitted herein to avoid redundancy.

The transmission system of FIG. 13 is different in configuration from the transmission system of FIG. 1 in that a microprocessor 71 is provided in the image sensor 1 and another microprocessor 81 is provided in the image processing LSI 2.

To the microprocessor 71 (firmware operating on a microprocessor) of the image sensor 1, a coding rate is set at a timing of fabrication of the image pickup apparatus including the image sensor 1 and the image processing LSI 2. Upon transmission of image data, the microprocessor 71 outputs a parity length instruction signal to the ECC processing unit 22 to control error correction coding by the ECC processing unit 22 such that a parity of a data length corresponding to the set coding rate is produced. Processing by the image sensor 1 shown in FIG. 13 upon transmission of image data is same as that described hereinabove with reference to the flow chart of FIG. 4.

On the other hand, also to the microprocessor 81 of the image processing LSI 2, a coding rate equal to the coding rate set to the image sensor 1 is set upon a timing of fabrication of the image pickup apparatus having the image sensor 1 and the image processing LSI 2. Upon reception of image data, the microprocessor 81 outputs a parity length instruction signal to the ECC processing unit 45 to control error correction by the ECC processing unit 45 such that a parity of a data length corresponding to the set coding rate is detected and error correction is carried out. Processing by the image processing LSI 2 shown in FIG. 13 upon reception of image data is same as that described hereinabove with reference to the flow chart of FIG. 5.

Figure 14:
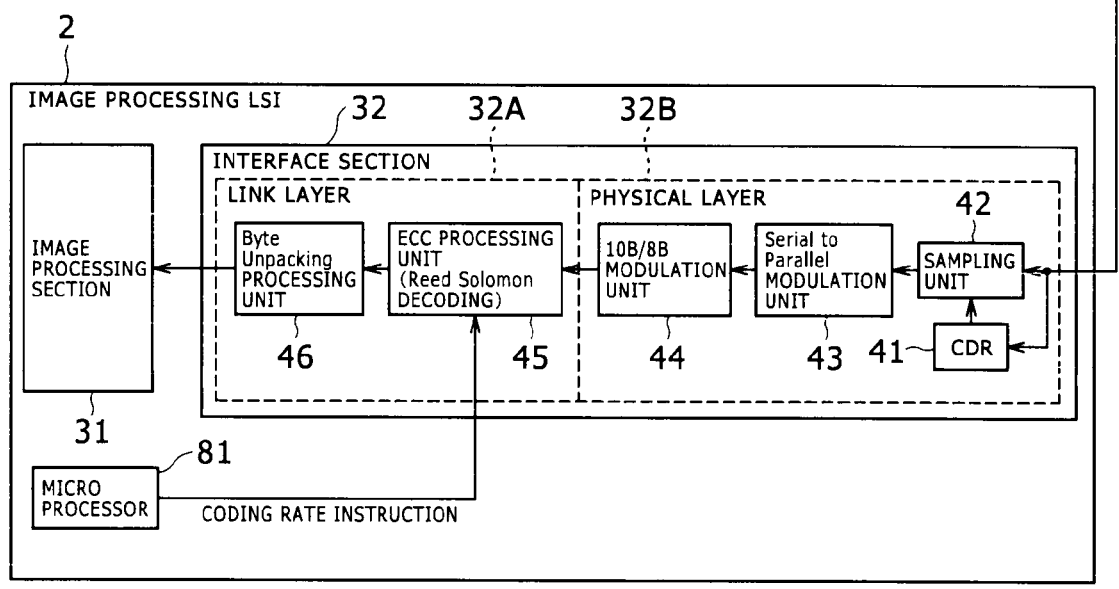
FIG. 14 is a view illustrating a relationship between a parity length and coding parameters.

FIG. 14 illustrates a relationship between the parity length represented by the parity length instruction signal and coding parameters.

Referring to FIG. 14, in the example illustrated, it is possible to set one of parity lengths of 0, 2 and 4 bytes by the parity length instruction signal. If the parity length is set to 0 bytes, then a parity which is redundant data is not added while no error correction capacity is applicable. On the other hand, if the parity length is set to 2 bytes, correction of one byte from among 226 bytes is permitted, but if the parity length is set to 4 bytes, correction of two bytes from among 228 bytes is permitted. While the description here is given of a case in which a parity of 2 bytes or 4 bytes is used as the Reed Solomon code, the parity length is not limited to any of 2 bytes and 4 bytes.

Consequently, the coding rate, that is, the parity length, can be set appropriately in response to the error rate of the transmission line. The error rate of the transmission line depends upon the performance of the physical length of the image sensor 1, the performance of the physical layer of the image processing LSI 2 and so forth. By making it possible to set a coding rate after specifications of the image sensor 1 and the image processing LSI 2 to be incorporated in the image pickup apparatus are determined without fixing the coding rate upon designing of the image sensor 1 and the image processing LSI 2, an appropriate coding rate can be set later.

Generally, as the data length of the parity increases, a higher error correction capacity is obtained. On the other hand, since the parity is redundant data, it is not preferable to transmit the parity from a point of view of the transmission rate and also the power consumption for error correction increases. Accordingly, by making it possible to set the coding rate by means of a microprocessor, an appropriate coding rate suitable for an error rate of a transmission line can be set. Consequently, while high speed data transmission can be achieved, the power consumption can be suppressed.

Example of the Configuration of the Computer

While the series of processes described above can be executed by hardware, it may otherwise be executed by software. In the case where the series of processes is executed by software, a program which constructs the software is installed from a program recording medium into a computer incorporated in hardware for exclusive use, a personal computer for universal use, and so forth.

FIG. 15 shows an example of a hardware configuration of a computer which executes the series of processes described hereinabove in accordance with a program.

Referring to FIG. 15, in the computer shown, a CPU (central processing unit) 101, a ROM (read only memory) 102 and a RAM (random access memory) 103 are connected to one another by a bus 104.

Further, an input/output interface 105 is connected to the bus 104. An inputting section 106 including a keyboard, a mouse and so forth, and an outputting section 107 including a display unit, a speaker and so forth are connected to the input/output interface 105. Also, a storage section 108 formed from a hard disk, a nonvolatile memory, or the like, a communication section 109 formed from a network interface or the like, and a drive 110 for driving a removable medium 111 are connected to the input/output interface 105.

In the computer configured in such a manner as described above, the CPU 101 loads a program stored, for example, in the storage section 108 into the RAM 103 through the input/output interface 105 and the bus 104 and executes the program to carry out the series of processes described above.

The program to be executed by the CPU 101 can be recorded on and provided as, for example, a removable medium 111 or can be provided through a wire or wireless transmission medium such as a local area network, the Internet or a digital broadcast, and installed into the storage section 108.

It is to be noted that the program to be executed by the computer may be of the type by which the processes are carried out in a time series in the order as described in the present specification or of the type by which the processes are executed in parallel or executed individually at necessary timings such as when the process is called.

While a preferred embodiment of the disclosed technology has been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-253833 filed in the Japan Patent Office on Nov. 12, 2010, the entire content of which is hereby incorporated by reference.

What is claimed is:

1. An image outputting apparatus, comprising:
an image pickup section;
an error correction code calculation section adapted to calculate an error correction code using pixel data, which configure a captured image, as an information word;
an outputting section adapted to output coded data, which are data of a codeword obtained by adding the error correction code to the pixel data, to an image processing apparatus provided in an apparatus in which said image outputting apparatus is provided;
an error correction section adapted to carry out error correction of the pixel data based on the error correction code included in the coded data;
a division section adapted to allocate a plurality of the coded data to a plurality of transmission lines between said image outputting apparatus and the image processing apparatus wherein a plural number of said outputting sections equal to a number of the plurality of transmission lines between the image outputting apparatus and said image processing apparatus are provided;
said image processing apparatus further includes a coupling section configured to acquire the plurality of the coded data and output the plurality of the coded data in an order reverse to an allocation order of the plurality of the coded data to the plurality of transmissions lines by the image outputting apparatus; and
said error correction section carries out the error correction using the plurality of the coded data in an order in which the plurality of the coded data are outputted from said coupling section.

2. The image outputting apparatus according to claim 1, wherein said division section allocates coded data which configure a same codeword to different ones of the plurality of transmission lines.

3. The image outputting apparatus according to claim 1, wherein
a control section adapted the to set a coding rate for the codeword, wherein said error correction code calculation section carries out the calculation of the error correction code in accordance with a set coding rate.

4. An image outputting method for an image outputting apparatus, comprising:
picking up an image;
calculating, by an error correction code calculation section, an error correction code using pixel data, which configure the picked up image, as an information word;
outputting, by an outputting section, coded data, which are data of a codeword obtained by adding the error correction code to the pixel data, to an image processing apparatus provided in an apparatus in which the image outputting apparatus is provided;
carrying out error correction, by an error correction section, of the pixel data based on the error correction code included in the coded data;
allocating, by a division section, a plurality of the coded data to a plurality of transmission lines between said image outputting apparatus and the image processing apparatus wherein a number of the plurality of the coded data is equal to a number of the transmission lines;
acquiring, by a coupling section, the plurality of the coded data and output the plurality of the coded data in an order reverse to an allocation order of the plurality of the coded data to the plurality of transmission lines by the image outputting apparatus;
wherein said error correction is carried out using the plurality of the coded data in an order in which the plurality of the coded data are outputted from said coupling section.

5. A non-transitory computer-readable storage medium storing computer-readable instructions thereon, which, when executed by an image outputting apparatus including one or more integrated circuits, cause the image outputting apparatus to perform a method comprising:
picking up an image,
calculating, by an error correction code calculation section, an error correction code using pixel data, which configure the picked up image, as an information word,
outputting, by an outputting section, coded data, which are data of a codeword obtained by adding the error correction code to the pixel data, to an image processing apparatus provided in an apparatus in which the image outputting apparatus is provided,
allocating, by a division section, a plurality of the coded data to a plurality of transmission lines between said image outputting apparatus and the image processing apparatus wherein a number of the plurality of the coded data is equal to a number of the transmission lines,
acquiring, by a coupling section, the plurality of the coded data and output the plurality of the coded data in an order reverse to an allocation order of the plurality of the coded data to the plurality of transmission lines by the image outputting apparatus,
wherein said error correction is carried out using the plurality of the coded data in an order in which the plurality of the coded data are outputted from said coupling section.

6. An image processing apparatus, comprising:
a reception section adapted to receive coded data which are data of a codeword produced by and outputted from an image pickup apparatus provided in an apparatus in which said image processing apparatus is provided, the codeword including pixel data which configure an image obtained by image pickup by an image pickup section of the image outputting apparatus and an error correction code calculated using the pixel data as an information word and added to the pixel data;

an error correction section adapted to carry out error correction of the pixel data based on the error correction code included in the coded data; and an image processing section adapted to process the image configured from the pixel data after the error correction, wherein a plural number of said reception sections equal to a number of plural transmission lines between the image outputting apparatus and said image processing apparatus are provided, said image processing apparatus further includes a coupling section adapted to acquire a plurality of the received coded data and output the plurality of the received coded data in an order reverse to an allocation order of the plurality of the received coded data to the plural transmission lines by the image outputting apparatus, and said error correction section carries out the error correction using the coded data in an order in which the coded data are outputted from said coupling section.

7. The image processing apparatus according to claim 6, further comprising:

a control section adapted to set a coding rate of the codeword, wherein said error correction section carries out the error correction in accordance with the set coding rate.

8. An image processing method for an image processing apparatus including one or more integrated circuits, comprising:

receiving, by a reception section, coded data which are data of a codeword produced by and outputted from an image pickup apparatus including one or more integrated circuits provided in an apparatus in which the integrated circuits of the image processing apparatus are provided, the codeword including pixel data which configure an image obtained by image pickup of an image outputting apparatus and an error correction code calculated using the pixel data as an information word and added to the pixel data;

carrying out, by an error correction section, error correction of the pixel data based on the error correction code included in the coded data;

processing, by an image processing section, the image configured from the pixel data after the error correction;

providing a plural number of said reception sections equal to a number of plural transmission lines between the image outputting apparatus and said image processing apparatus;

acquiring, by a coupling section, a plurality of the received coded data and output the plurality of the received coded data in an order reverse to an allocation order of the plurality of the received coded data to the plural transmission lines by the image outputting apparatus;

wherein error correction is carried out using the plurality of the coded data in an order in which the plurality of the coded data are outputted from said coupling section.

9. A non-transitory computer-readable storage medium storing computer-readable instructions thereon, which, when executed by an image processing apparatus including one or more integrated circuits, cause the image processing apparatus to perform a method comprising:

receiving, by a reception section, coded data which are data of a codeword produced by and outputted from an image pickup apparatus including one or more integrated circuits provided in an apparatus in which the integrated circuits of the image processing apparatus are provided, the codeword including pixel data which configure an image obtained by image pickup by an image outputting apparatus and an error correction code calculated using the pixel data as an information word and added to the pixel data;

carrying out, by an error correction section, error correction of the pixel data based on the error correction code included in the coded data; and processing, by an image processing section, the image configured from the pixel data after the error correction;

providing a plural number of said reception sections equal to a number of plural transmission lines between the image outputting apparatus and said image processing apparatus;

acquiring, by a coupling section, a plurality of the received coded data and output the plurality of the received coded data in an order reverse to an allocation order of the plurality of the received coded data to the plural transmission lines by the image outputting apparatus;

wherein error correction is carried out using the plurality of the coded data in an order in which the plurality of the coded data are outputted from said coupling section.

10. An image pickup apparatus, comprising:

an image outputting apparatus; and an image processing apparatus; wherein said image outputting apparatus includes an image pickup section, an error correction code calculation section adapted to calculate an error correction code using pixel data, which configure an image obtained by image pickup by said image pickup section, as an information word, and an outputting section adapted to output coded data, which are data of a codeword obtained by adding the error correction code to the pixel data, to said image processing apparatus, said image processing apparatus includes a reception section adapted to receive the coded data, an error correction section adapted to carry out error correction of the pixel data based on the error correction code included in the coded data, and an image processing section adapted to process the image configured from the pixel data after the error correction, wherein a plural number of said reception sections equal to a number of plural transmission lines between the image outputting apparatus and said image processing apparatus are provided, said image processing apparatus further includes a coupling section adapted to acquire a plurality of the received coded data and output the plurality of the received coded data in an order reverse to an allocation order of the plurality of the received coded data to the plural transmission lines by the image outputting apparatus, and said error correction section carries out the error correction using the coded data in an order in which the coded data are outputted from said coupling section.

\* \* \* \* \*